Oct. 13, 1964  K. W. ALLEN  3,152,958
NUCLEAR FUSION METHOD

Filed Sept. 2, 1958  2 Sheets-Sheet 1

INVENTOR
KENNETH WILLIAM ALLEN

ATTORNEYS

United States Patent Office 3,152,958
Patented Oct. 13, 1964

3,152,958
NUCLEAR FUSION METHOD
Kenneth William Allen, Basingstoke, Hants, England, assignor to United Kingdom Atomic Energy Authority, London, England
Filed Sept. 2, 1958, Ser. No. 758,622
Claims priority, application Great Britain Sept. 2, 1957
1 Claim. (Cl. 176—1)

This invention relates to nuclear fusion reactors wherein the nuclear fusion reaction is the DT reaction.

For the purposes of this invention, nuclear fusion reactions are reactions involving colliding nuclei and occur in a plasma consisting of free nuclei moving in a cloud of free electrons. The reactions occur at a significant rate only when the mean kinetic energy of the nuclei in the plasma is high, and become useful for the production of energy (i.e. there is a net energy gain) when the energy produced in the reaction is about equal to that radiated by the plasma. For example the cross-section of the DT reaction increases very sharply with increasing mean kinetic energy of the nuclei and reaches a significant quantity when the mean kinetic energy is at least about 1 kev.; furthermore in this energy region nuclear fusion reactions can begin to have a net energy gain.

The major requirements for producing controlled nuclear fusion reactions are firstly to increase the mean kinetic energy of the nuclei to at least about 1 kev., secondly to contain these nuclei within a space for a sufficient time to allow a significant number of nuclear collisions to occur, and thirdly to prevent the nuclei from colliding with the walls defining the space.

Various methods have been proposed to satisfy the first requirement. For example, in one method, a high current is induced in an ionised gas and the resistive energy produced heats the gas, e.g. as described in copending applications S.N. 692,500, Thonemann, Carruthers and Bickerton, now Patent 3,054,742, dated September 18, 1962, and S.N. 701,931, Bickerton, now abandoned. In another proposed method an ionised gas at a temperature of at least about $10^5$° C. is compressed adiabatically, and in a third proposed method an ionised gas is heated by a rapid thermodynamically irreversible compression.

Various methods have been proposed to satisfy the second and third requirements. For example, in one proposal a unidirectional current is produced in an ionised gas or in a plasma and acts to confine the charged particles (the so-called "pinch effect"). In another proposal an axial magnetic field is applied to balance the kinetic pressure of a plasma.

This invention does not depend upon any particular method of producing the nuclear fusion reaction and the reactor need not have a net power gain. It provides an improvement whereby a nuclear fusion reactor operating on the DT reaction can breed more tritium than the DT reaction consumes.

The invention consists in a nuclear fusion apparatus comprising a vessel for containing deuterium and tritium, means for heating the gas to a kinetic temperature at which fusion reactions occur between deuterium and tritium, and a blanket comprising $Li^6$ and $Li^7$ surrounding at least part of the vessel.

The DT fusion reaction can be written as $$D + T \rightarrow He^4 + n + 17.6 \text{ mev}$$

The released neutron is fast, having an average energy of 14 mev., and carries away about ⅘ of the fusion energy. Large amounts of energy must therefore be dissipated in the blanket material.

The blanket can thus be used as a source of heat, for example, for raising steam. However the energy obtained in this manner will be less important than that obtained directly from the discharge. Electrical power can be obtained directly from the fusion reaction by interaction between the fast alpha particle released in the DT reaction and the magnetic field used to contain the discharge. For example when the reactor uses a unidirectional pulsed pinched discharge stabilised by the combined action of an applied axial magnetic field trapped within the discharge channel and a thick electrically conducting wall, this can be done by controlling the discharge current in such a way as to cycle the gas within the discharge repetitively through a closed thermodynamic cycle during the period of the discharge. The cycling of the current produces a corresponding cycle in the effective inductance of the discharge and the electrical energy output and the variations can be used to induce electrical currents in suitably placed coils. The interaction of neutrons with lithium to produce tritium or to multiply neutrons can be written as:

| | |
|---|---|
| $Li^7$ (n, 2n) $Li^6$ | Q = −7.25 mev. |
| $Li^7$ (n, t) α+n | Q = −2.57 mev. |
| $Li^6$ (n, 2n) α+p | Q = −3.70 mev. |
| $Li^6$ (n, t) α | Q = +4.79 mev. |

It has been found that the cross-section of $Li^7$ in the reaction $$Li^7 \text{ (n, t) } \alpha + n$$

is surprisingly high, above the threshold of 5.2 mev. For example the cross-section for this reaction at 14 mev. is 350 mb. Although the cross-section is high, a blanket consisting of pure $Li^7$ cannot allow the production of more than one tritium nucleus per neutron used in $Li^7$ reactions; that is, there cannot be more than one tritium nucleus produced per tritium nucleus used up in the DT reaction. Normal escape of neutrons and tritium atoms from any practical system, and the effect of competing reactions, would prevent there being sufficient tritium produced by a pure $Li^7$ blanket to sustain the DT fusion reaction.

The provision of $Li^6$, preferably about 0.1 to 50% of the total lithium, in the blanket allows the production of more tritium than is consumed in the DT reaction. The reaction $Li^6$ (n, t)α has a cross-section of 25 mb. at 14 mev., and 958 b. at thermal energies, and is the dominant reaction at thermal energies since the only significant competing reaction, $Li^7$ (n, γ) $Li^8$, has a cross-section of 33 mb. at thermal energies.

DT neutrons absorbed in a blanket of $Li^6$ and $Li^7$ can thus produce tritium by (a) fast reactions with $Li^7$, (b) further fast reactions of inelastically scattered neutrons with $Li^7$, and (c) capture in $Li^6$ either as fast neutrons or after moderation.

A homogeneous blanket of natural lithium 3 to 7 ft. thick would allow the production of 1.2 to 1.6 tritium nuclei per tritium nucleus consumed in the DT reaction, 0.5 to 0.6 nuclei being from $Li^7$ reactions. The thickness of the blanket would need to be greater if coolant channels were provided in it or if the blanket were made as a network of pipes through which molten lithium or a solution of a lithium compound is circulated, as a lattice of blocks or rods of lithium or a lithium alloy, or were a powdered lithium material. The thickness would need to be slightly less for higher proportions of $Li^6$, e.g. it would be 4 to 7 ft. thick when the proportion of $Li^6$ is 0.1%, and 3 to 5 ft. thick when the proportion is 50%. If desired a neutron moderator containing hydrogen can be used to assist in the slowing of neutrons to thermal energies to take part in the $Li^6$ reaction; for example lithium hydride could be used as an outer layer.

The thickness of the blanket can be reduced by providing a second blanket comprising beryllium or thorium, between the reactor vessel and the lithium blanket. The purpose of the second blanket is to act as a neutron multiplier. The interaction of beryllium with fast neutrons can be considered to comprise three separate reactions, which are:

(a) $Be^9 + n \rightarrow 2He^4 + 2n - 1.7$ mev. (0.49 b. at 14 mev.)
(b) $Be^9 + n \rightarrow He^4 + He^6 - 0.64$ mev. (0.03 b. at 14 mev.)
(c) $Be^9 + n \rightarrow Li^7 + T - 10.42$ mev. (very small at 14 mev.)

The neutrons produced in reaction (a), which has an extremely low threshold for an n, 2n reaction, have an average energy of 5 mev. when the incident neutron had an energy of 14 mev., and at least one is thus available for use again. $He^6$ produced in reaction (b) decays with a half-life of 0.8 second to $Li^6$ which can be used in the $Li^6$ reactions given above. Reaction (c) produces tritium directly and also $Li^7$ which is then available for the $Li^7$ reactions given above.

The beryllium blanket should be desirably have a thickness of 2 to 20 inches to give a neutron multiplication of 1.5 to 3. The thickness would of course need to be greater if a beryllium compound were used or if other materials were present.

The important interactions of thorium with fast neutrons are:

$Th^{232} + n \rightarrow$ fission products $+ 2.5$ to 3.5 neutrons
$\qquad -1.2$ mev. (0.34 b. at 14 mev.)
$Th^{232} + n \rightarrow Th^{231} + 2n - 6$ mev. (1 b. at 14 mev.)
$Th^{232} + n \rightarrow Th^{233} + \gamma$ (0.01 to 0.6 b. at 14 mev.)
$\qquad \rightarrow PPa^{233} \rightarrow U^{233}$ The thorium blanket should, when formed of homogeneous metal, desirably have a thickness of 1 to 12 inches to give a neutron multiplication in the range 1.2 to 2.5.

The invention will be better understood with reference to the accompanying drawing, wherein.

Figure 1:
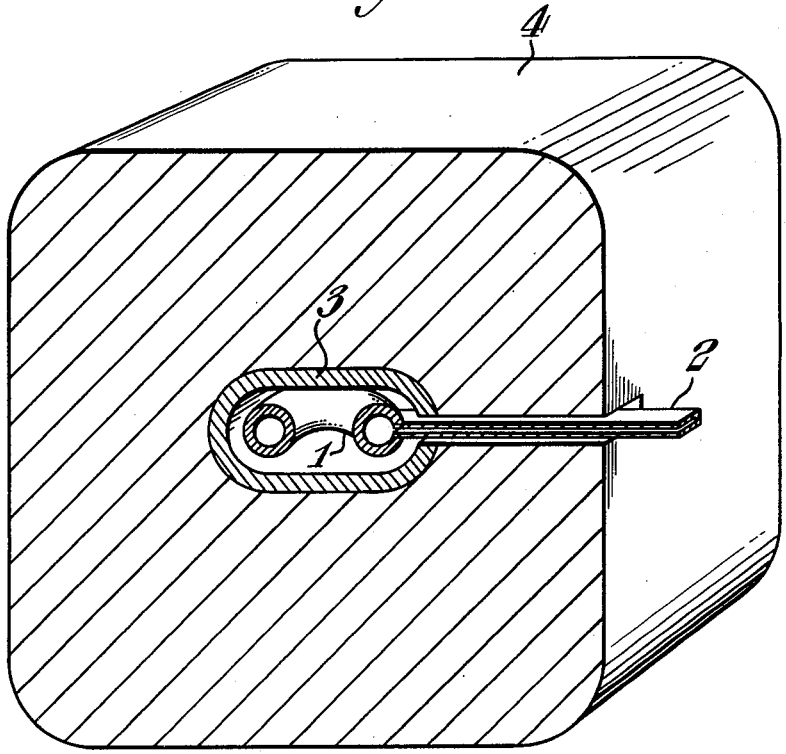
FIG. 1 is a diagrammatic sectional perspective view of a breeder reactor according to the invention.

In FIG. 1 a nuclear fusion reactor 1 is provided with a channel 2 for carrying necessary services such as gas conduits and electrical leads. The reactor 1 is supported in a chamber formed by a beryllium blanket 3, the chamber allowing the above-mentioned services to be provided at the appropriate points of the reactor 1. A vessel 4 contains pipes through which a fluid lithium material can be circulated and drawn off for extraction of tritium as desired.

Figure 2:
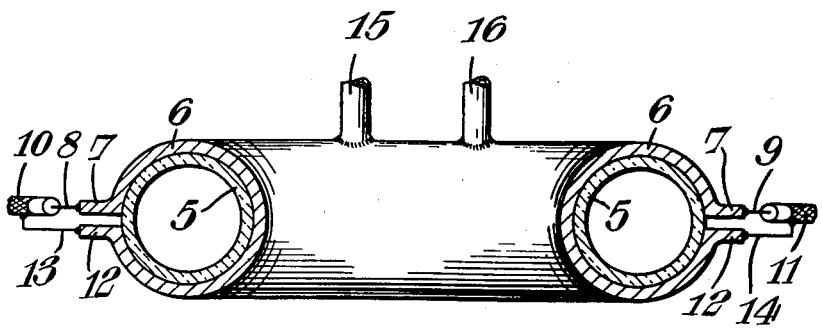
FIG. 2 is a sectional elevation of a suitable nuclear fusion reactor.

In FIG. 2 a quartz toroidal tube 5 is enclosed tightly in an envelope 6 of copper about 1 inch thick. A flange 7 on the envelope is connected to centre leads 8 and 9 of cables 10 and 11 respectively. A second flange 12 on the envelope is connected to the earth leads 13 and 14 of cables 10 and 11 respectively. A gas entry port 15 and a gas exit port 16 are provided.

Figure 3:
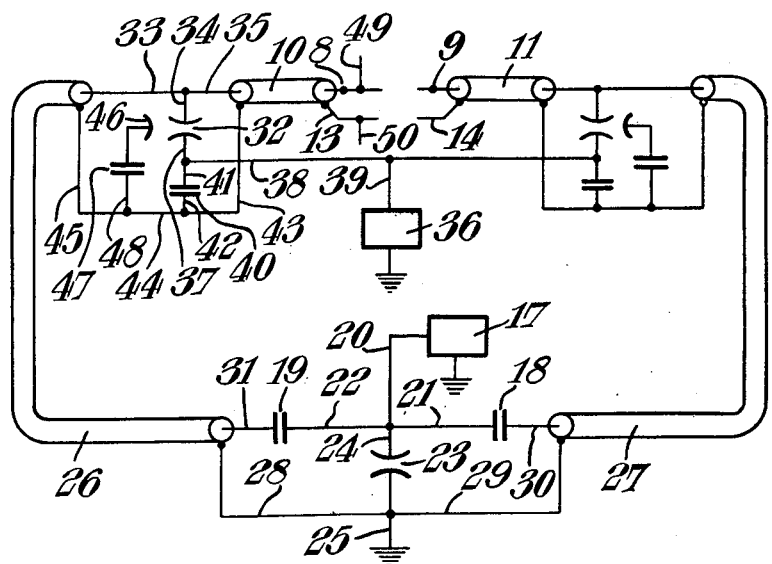
FIG. 3 is a diagram of a circuit as described in co-pending application No. 743,282, Fitch, now Patent 2,946,923, dated July 26, 1960, for producing a large current having a high $dI/dt$.

In FIG. 3 a source 17 of 60 kv. D.C. is connected to condensers 18 and 19 by leads 20, 21 and 22 and to one side of a spark gap 23 by lead 24. The other side of the spark gap 23 is earthed at 25 and is connected to the earth lead of co-axial cables 26 and 27 by leads 28 and 29. Condensers 18 and 19 are connected to the centre leads of cables 26 and 27 by leads 30 and 31. The centre lead of cable 26 is connected to one side of spark gap 32 by leads 33 and 34 and to the centre lead of co-axial cable 10 by leads 33 and 35. The other side of spark gap 32 is connected to a source 36 of 30 kv. D.C. by leads 37, 38 and 39 and to one plate of condenser 40 by leads 37 and 41. The other plate of condenser 40 (capacity about 0.5μf.) is connected to the earth leads of cables 26 and 10 by leads 42, 43, 44 and 45. The spark gap 32 is provided with a third plate 46 connected to one side of a condenser 47, of greater capacity and inductance than condenser 40, the other plate of which is connected to leads 44 and 45 by lead 48. Leads 49 and 50 are provided to establish an R.F. discharge through the gas. The circuit connected between cables 11 and 27 is identical with that just described and connected between cables 10 and 26.

It can be seen that FIG. 3 shows two identical circuit units for providing a heavy current for the toroidal tube. In practice about one hundred of these units would be used.

The apparatus described operates as follows:

The lithium material is circulated through the pipes in vessel 4 by pumps (not shown). The lithium acts as a blanket and also as a coolant.

The tube 5 is evacuated and a mixture of deuterium and tritium is passed into the tube until a pressure of about $5 \times 10^{-2}$ mm. of mercury is reached. A low power R.F. discharge is provided via leads 49 and 50 to cause pre-ionisation of the gas. Condensers 18 and 19 are charged by source 17 until spark gap 23 breaks down, thus causing the condensers to discharge through cables 26 and 27. Considering cable 26 only, the discharge causes spark gap 32 to break down and allows condenser 40, which has been charged by source 36 to discharge through cable 10, thus applying a heavy current to the toroidal tube. The heavy current is prolonged by a "crowbar" circuit comprising the condenser 47 and the associated plate 46 of the spark gap 32. The "crowbar" circuit operates when the gap 32 breaks down, since this allows capacitor 47 to discharge via plate 46 associated with gap 32.

The positive beta current passing through the envelope 6 induces a toroidal current sheet in the gas with the current flowing in the negative beta direction. Interaction between the two toroidal currents results in implosion of the gas towards the toroidal axis, resulting in heating of the gas by thermodynamically irreversible compression and the production of a hot plasma. The $H_z$ magnetic field produced by the positive beta current surrounds the plasma and acts to confine it. The "crowbar" circuit then acts to lengthen the life of the positive beta current. The negative beta current in the plasma decays gradually because of resistive losses and the $H_z$ magnetic field diffuses into the plasma. After a short time, and before the passage of positive beta current has ended, the plasma spreads over the space in the torus and contains the trapped $H_z$ field which acts to prevent substantial diffusion of plasma particles to the torus walls. The life of this system is limited by the diffusion of the plasma particles to the walls.

The 14 mev. neutrons produced by the DT reaction undergo the various reactions already given and result in a yield of tritium greater than that consumed in the DT reaction. The tritium is separated from the lithium and passed into the reactor 1 in the necessary amounts via channel 2.

I claim:

A method of breeding excess tritium fuel from neutrons produced by the DT reaction comprising carrying out said reaction in a reactor enclosed at least in part by a lithium blanket containing lithium 6 and lithium 7 in proportions of 0.1 to 50% and 99.9 to 50% respectively, and irradiating said blanket with neutrons having a minimum energy of 5.2 mev. obtained from said DT reaction, the blanket having a thickness of at least three feet so that said neutrons from the reaction react with lithium 7 to produce tritium and slower neutrons and said slower neutrons react with lithium 6 to produce more tritium.

References Cited in the file of this patent

UNITED STATES PATENTS

| | | |
|---|---|---|
| 2,161,985 | Szilard | June 13, 1939 |
| 2,902,613 | Baldwin et al. | Sept. 1, 1959 |
| 2,910,414 | Spitzer | Oct. 27, 1959 |

FOREIGN PATENTS

| | | |
|---|---|---|
| 656,398 | Great Britain | Aug. 22, 1951 |

OTHER REFERENCES

Atomic Industry Reporter, News and Analysis, Official Text, Section 1958, Library No. TK 9001 A7, issue of Jan. 29, 1958, pages 54:5–54:11.

AECD–3712, History and Status of the EBR by W. E. Unbehaun, Apr. 15, 1953, pages 9, 10.

February 1958 Nucleonics, pp. 90–93, 151–155.

Nature, January 1958, pp. 217–220, 222–224, 226–230.

August 1957 Nucleonics, pp. 50–55.

April 1949 Power Generation, pp. 76, 126–128.

J. Nuclear Energy II (1957), vol. 5, pp. 71–73, 82, an article by Bazbatchenko et al.